Patented Jan. 4, 1949

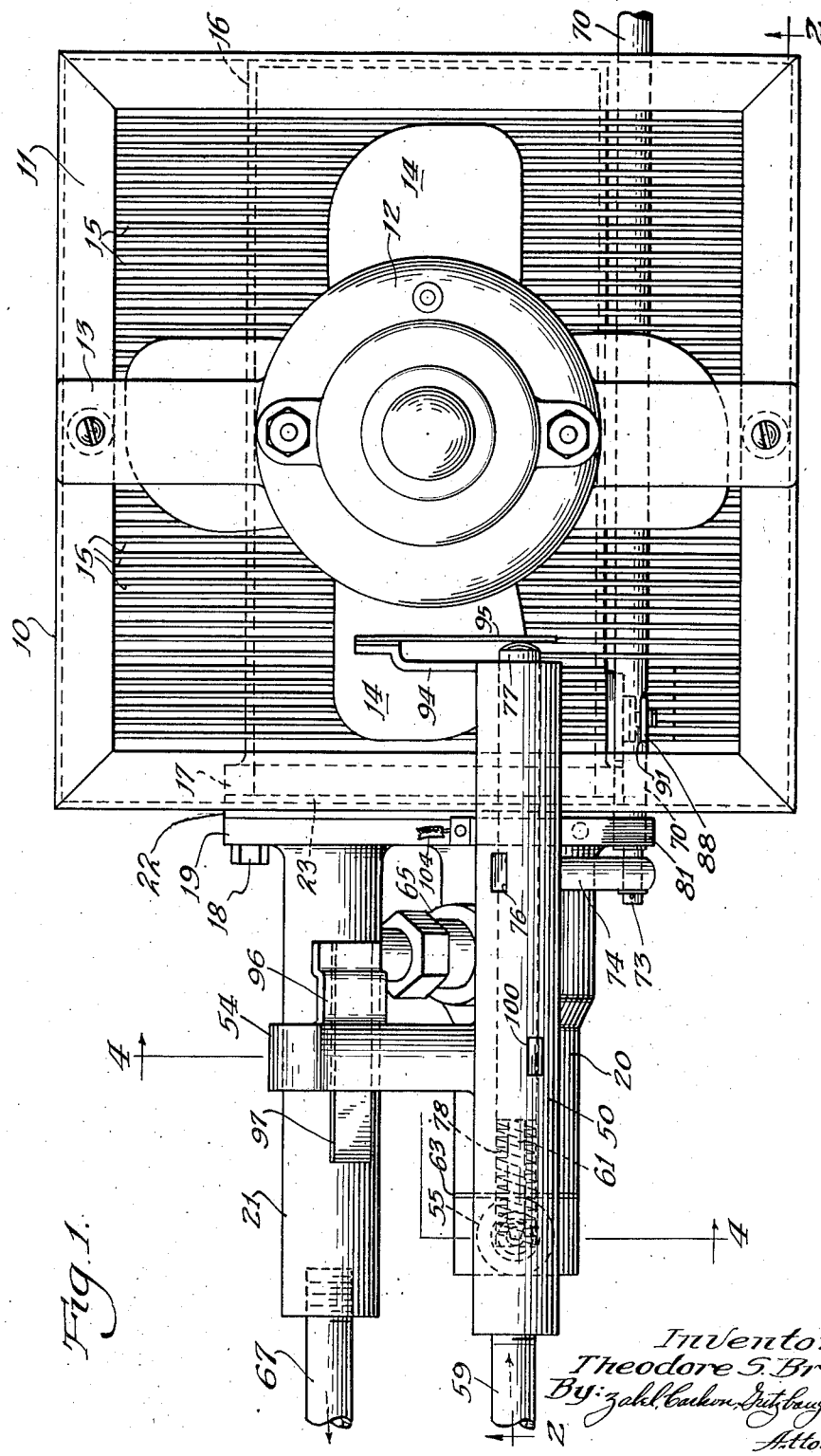

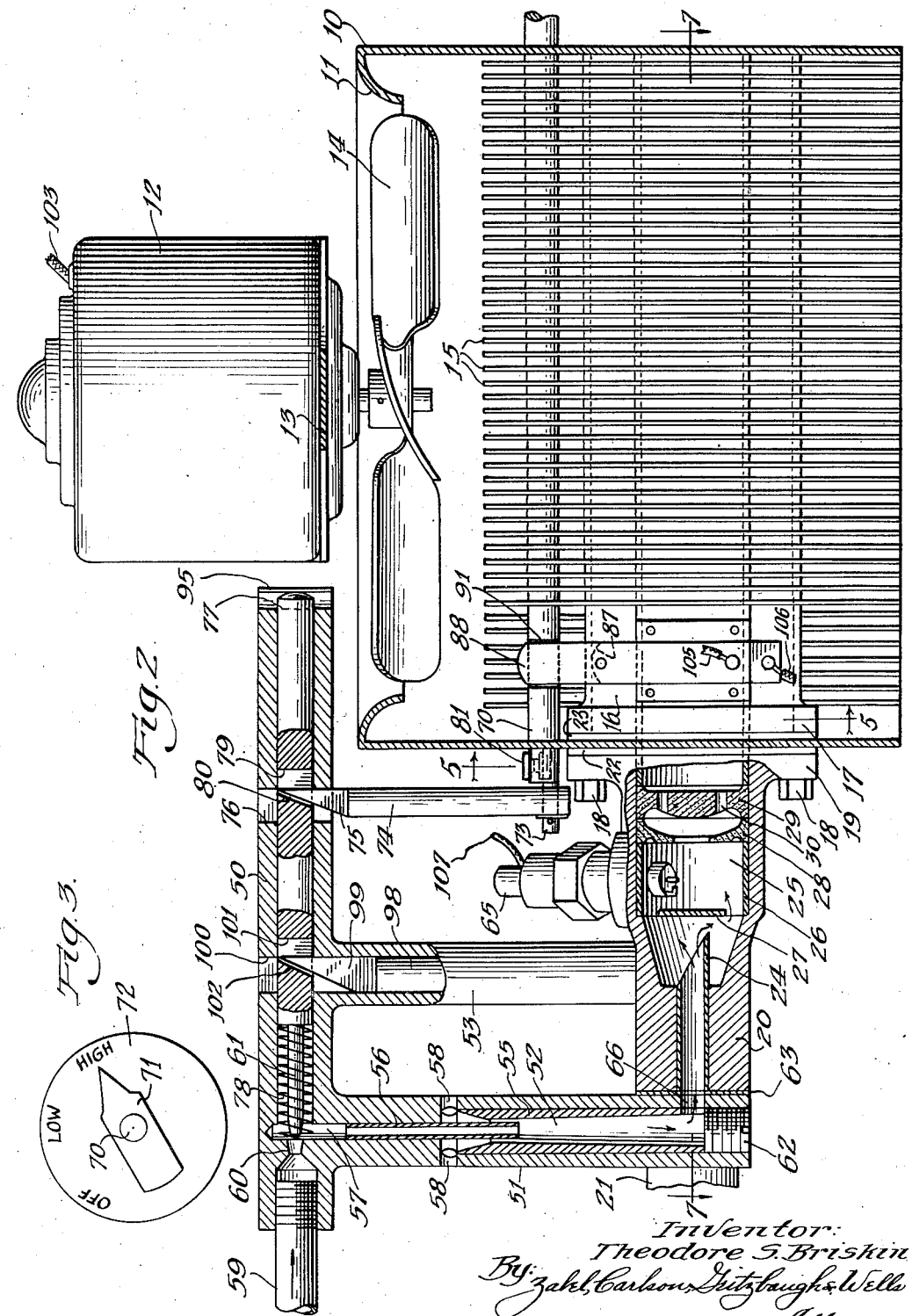

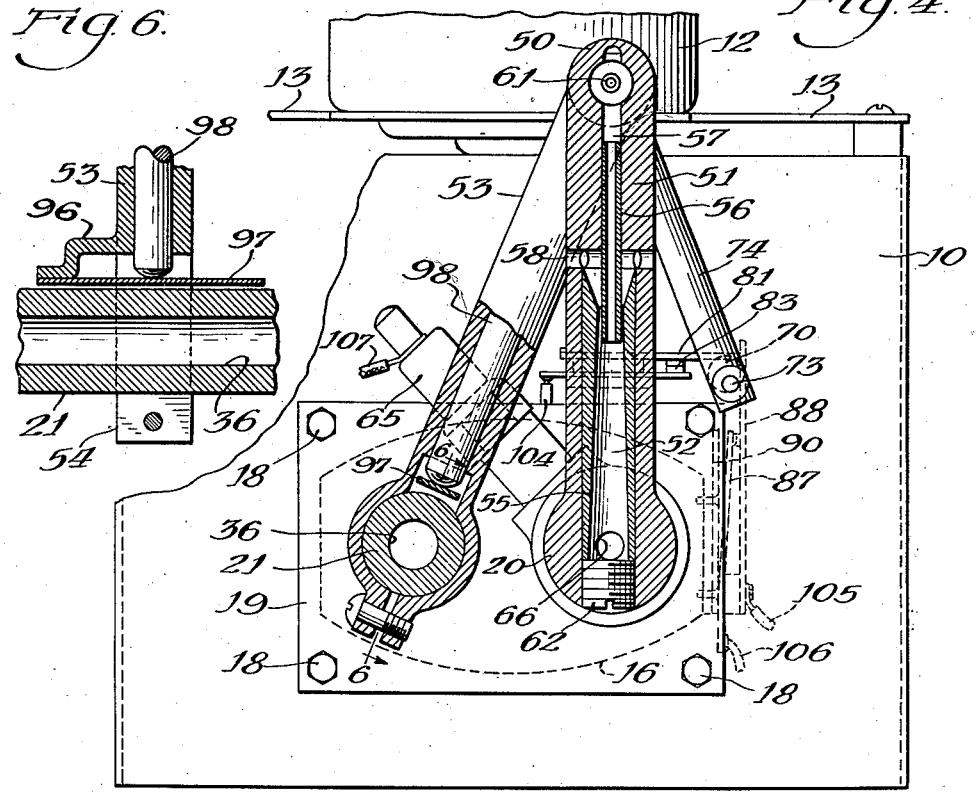

2,457,862

UNITED STATES PATENT OFFICE 2,457,862

COMBUSTION HEATER WITH THERMALLY CONTROLLED FUEL SUPPLY

Theodore S. Briskin, Chicago, Ill., assignor to Excel Auto Radiator Company, Chicago, Ill., a corporation of Delaware Application December 21, 1942, Serial No. 469,668

5 Claims. (Cl. 158—28)

1

This invention relates to improvements in combustion heaters having a thermally controlled fuel supply, the heaters being af a type particularly adapted for use in automobiles or airplanes.

It is an object of this invention to provide in a combustion heater, improved control means for the regulation of the fuel so that the amount of fuel supplied to the heater may be cut down automatically when the temperature of the heater becomes too great.

Another object of this invention is to provide an improved manual control means for the operation of the heater, the arrangement being such that a single control means regulates the flow of fuel, the blower circuit, and the operation of an ignition device.

A still further object of this invention is to provide in a combustion heater, fuel control means which is subject to both manual control and to automatic control.

Various other objects, features and advantages will become apparent as the description proceeds.

Reference is hereby made to the accompanying drawings which form a part of this specification, and in which a preferred embodiment of this invention is illustrated, like reference numerals referring to like parts:

Fig. 1 is a plan view of a preferred embodiment of this invention;

Fig. 2 is a sectional elevation taken along line 2—2 of Fig. 1;

Fig. 3 is an elevation of the dial and control knob;

Fig. 4 is a section taken along the line 4—4 of Fig. 1;

Fig. 5 is a detailed section taken along line 5—5 of Fig. 2.

Fig. 6 is a detailed section taken along line 6—6 of Fig. 4;

Fig. 7 is a detailed isometric view of the manual control shaft.

With reference now to Figs. 1 and 2, the heater comprises a housing 10 surrounding the four sides of the heater, the upper edges of the housing being provided with inturned flanges 11. A motor 12 is positioned above the housing 10 and is mounted by means of motor brackets 13 which, as shown in Fig. 4, may be secured to the housing by any suitable means, such as by a screw and a spacer. A fan 14 is driven by the motor, the fan being positioned in the upper portion of the housing 10 and above a plurality of fins 15 which are enclosed by the housing.

A manifold chamber 16 is disposed within the housing, the fins being mounted on the manifold chamber and being held in spaced relation with each other by any suitable means, such as by welding the fins to the walls of the manifold chamber. The manifold chamber provides at its interior, combined combustion and heat exchange means. The manifold chamber is provided with a flange 17 into which a plurality of studs 18 are threaded whereby the manifold chamber may be secured to the housing 10 in the manner hereinafter described.

A plate 19 having two cylindrical bosses 20 and 21 cast integrally therewith is positioned adjacent the housing 10 at a point opposite the manifold chamber 16. A heat resistant gasket 22 is interposed between the plate 19 and the side wall of the housing, and a similar heat resistant gasket 23 is positioned between the manifold chamber and the side wall of the housing, the studs 18 passing through the plate 19, the gaskets 22 and 23, and the side wall of the housing 10, so that the whole assembly may be rigidly secured together.

The boss 20 is drilled to receive an inlet tube 24 which extends into a larger cavity formed within the boss which cavity may be referred to as the ignition chamber 25. A heat resistant cup-shaped member 26, the closed end of which is perforated so as to provide a baffle 27, is fitted into the ignition chamber. Discs 28 and 29 of refractory material are positioned adjacent the open end of the cup-shaped member 26, the disc 28 being perforated at its central portion and being undercut peripherally thereof to form an annular conduit as indicated at 30, and the disc 29 being provided with a plurality of peripherally arranged perforations 31 to form passageways communicating with the conduit 30.

The boss 21 is drilled to provide an outlet passage 36.

A tubular member 50 is disposed above the inlet boss 20, as shown in Fig. 2, and is provided with two arms 51 and 53. The arm 51 is drilled to provide a mixing chamber 52 at the lower portion thereof, and the arm 53, which is of tubular form, receives a sliding control rod 98, and terminates in a clamp 54 which is secured to the outlet boss 21, as shown in Figs. 4 and 6. By means of this clamp, the tubular member 50 and its associated parts are mounted with respect to the other portions of the heater.

The mixing chamber 52 is provided with a liner 55 which is in the form of a Venturi tube. The upper portion of the arm 51 is drilled to provide a gasoline passageway 57, and a gasoline supply tube is positioned in the passageway and extends downwardly to the constricted portion of the Venturi tube. The plurality of laterally disposed air inlets 58 are formed in the arm 51 at the upper portion of the mixing chamber. It will be seen that the parts just described function in the usual manner to carburet the gasoline which is fed into the ignition chamber 25.

The upper left hand end of the tubular member 50, as shown in Fig. 2, is threaded to receive a gasoline supply line 59, and is also drilled so as to provide a valve seat 60, with which cooperates a valve 61 whereby the amount of gasoline flowing from the gasoline line 59 into the mixing chamber 52 may be controlled. A plug 62 closes the lower end of the mixing chamber and holds the liner 55 in place. A passageway 66 provides communication between the mixing chamber 52 and the inlet tube 24. The lower portion of the arm 51 is secured to the end surface of the boss 20 by means of screws 64, and a heat resistant gasket 63 is interposed between the two members.

A spark plug 65 is mounted in the wall of the ignition chamber 25 so that the carburetted gasoline which is drawn into the ignition chamber may be ignited. The burning mixture then passes through the passageways in the discs 28 and 29 and further combustion takes place in the chamber 16. The hot gases then pass through the manifold chamber as above described and pass out through the outlet passageway 36 and through a conduit 67 into the intake manifold of the gasoline engine. The conduit 67 is screw-threaded into the end of the boss 21, as shown in Fig. 1. After combustion continues for a short period of time, the refractory discs 28 and 29 become heated to the state of incandescence so that the ignition provided by the spark plug 65 is no longer needed. Means, to be hereinafter described, are provided for breaking the circuit to the spark plug when this state has been attained. It will be noted in this connection that the combustible mixture in passing from the ignition chamber 25 into the combustion chamber 35 is exposed to heat radiated from all directions due to the undercut construction of the discs 28 and 29, and all the heat so radiated is absorbed by the combustible mixture. Furthermore, any unvaporized droplets of gasoline, having a greater inertia than the vapor, will impinge upon the central portion of the disc 29 and will be vaporized before passing through the perforations 31 into the combustion chamber. The construction herein illustrated has been found to form a highly efficient means of ignition.

A control shaft 70 is journalled in the walls of the housing 10, as shown in Fig. 2, and is provided at its exterior end with a knob 71 in the form of a pointer, as shown in Fig. 3. A dial 72 is positioned adjacent to the knob 71 and is provided with indicia to indicate the position of the parts. The dial and the knob may be positioned at any point which is readily accessible to the operator, and not necessarily on the housing 10. The inner end of the control shaft 70 is provided with an eccentrically mounted pin 73 upon which is journalled a valve control rod 74. The upper end 75 of the valve control rod is flattened and is wedge-shaped, and is received in a slot 76 formed in the tubular member 50. The valve 61 is mounted on a plunger 77 which is slidably disposed within the tubular member 50, a spring 78 being provided to bias the valve to open position. The plunger 77 is provided with a slot 79 through which the upper end 75 of the valve control rod may project, this slot being provided with a cam surface 80 which cooperates with the wedge-shaped upper end 75 to displace the plunger 77 and the valve 61 toward closed position.

The parts are so arranged that when the knob 71 is disposed in its "high" position, the valve control rod 74 is retracted, as shown in Fig. 2, so that the valve 61 is open and a maximum amount of gasoline may be supplied to the mixing chamber 52. When the knob 71 is rotated to its "low" position, the valve is partially closed, thereby limiting the amount of gasoline supplied. When the knob is in its "off" position, the valve is completely closed, by virtue of the displacement of the plunger 77 by the control rod 74.

Manipulation of the control shaft also controls the operation of the motor 12 and of the spark plug 65, by means of contacts 83 which are in circuit with the motor 12, and contacts 86 which are in circuit with the spark plug 65, both sets of contacts being suitably insulated from the other parts of the heater. The contacts 83 are carried by a pair of contact strips 81 and 82 which are mounted on an insulating block 84 positioned adjacent the housing 10 and above the plate 19. The contact strip 81 extends into contact with the control shaft 70, which at this point is provided with a recessed portion 85. The angular disposition and the configuration of this recessed portion with respect to the control shaft are shown in Fig. 9, and are such that when the control shaft is in its "off" position, the contact strip 81 will be displaced upwardly and the motor circuit through the contacts 83 will be open. As the shaft is then rotated into its "low" position, the recessed portion is rotated into registry with the contact strip 81, permitting the contact strip to drop and the circuit to be closed.

The contacts 86 are carried by contact strips 87 and 88 which are mounted by means of a block 89 on an insulating plate 90 which is riveted to a thickened portion of the wall of the manifold chamber 16. The fins 15 are at this point cut away to accommodate the contact strips. The contact strip 88 extends into engagement with the control shaft 70, which at this point is provided with a recessed portion 91. The angular disposition and the configuration of the recessed portion 91 is shown in Fig. 9, and the shaft operates in a similar manner as mentioned above in connection with the recessed portion 85, to close the ignition circuit to the spark plug 65. The contact strip 87 is a bimetallic strip so that after the wall of the manifold chamber 16 has been heated to a predetermined degree, the contact strip 87 will straighten out against the plate 90, thereby separating the contact points 86 and opening the ignition circuit. The bimetallic strip is initially adjusted so that this action will not take place prior to the time that the refractory discs 28 and 29 have been heated to a state of incandescence.

As shown in Fig. 8, the contact points 83 are interposed between leads 104 and 103, the former leading to a battery, not shown, and the latter to the motor 12. The return circuit may be grounded. The contact points 86 are interposed between leads 105 and 106, the former leading to the above mentioned battery, and the latter to the primary of the usual spark coil, not shown. A spark coil consists of a circuit breaker, such as a vibrator, and a stepup transformer to produce a high tension current, for spark plugs and the like, from a low voltage direct current. As shown in Fig. 2, the spark plug 65 is provided with a lead 107 which may be connected to the secondary of the above mentioned spark coil.

As the knob 71 is rotated from its "off" position to its "low" position, as shown in Fig. 3, the circuits for the motor 12 and for the spark plug 65 will be closed simultaneously with the opening of the valve 61. Further rotation of the knob towards its "high" position will open the valve 61 still further, to supply greater amounts of gasoline to the heater without affecting the position of the two pairs of contact points 83 and 86. The spark plug circuit will be opened automatically when the auxiliary ignition means is no longer necessary.

Means other than the control shaft 70 are provided to regulate the supply of gasoline into the heater, these additional means being automatic in operation, and depending upon the temperature of the heater. For instance, if the motor 12 should fail, the heater would soon become overheated, and serious damage to the heater might thereby result. For this reason, a thermostatic control in the form of a bimetallic strip 95 is provided to shut off the gasoline supply. This bimetallic strip is mounted on a bracket 94 at one end of the tubular member, as shown in Figs. 1 and 2, the free end of the bimetallic strip bearing against the end of the plunger 77 which extends slightly beyond the tubular member 50. It will be seen, therefore, that the bimetallic strip 95 is kept in its straightened position as long as the fan draws cool air by it; upon failure of the fan, however, the increased radiation from the fins 15 will very quickly cause the bimetallic strip 95 to flex, thereby cutting off the gasoline supply or reducing it to such an extent that there will be no overheating.

Another bimetallic strip 97 is mounted above the outlet boss 21 by means of a bracket 96 formed on the arm 53. This bimetallic strip bears against the end of a control rod 98 which is slidably mounted within the arm 53, the upper end 99 of which control rod is flattened and wedge-shaped similar to the upper end 75 of the valve control rod 74. The tubular member 50 and the plunger 77 are provided with slots 100 and 101, respectively, to receive the wedge-shaped upper end 99, the slot 101 being provided with a cam surface 102 which causes the valve 61 to be displaced into its closed position when the control rod 98 is shifted upwardly by a flexing of the bimetallic strip 97. Thus, if the gasoline supply is such that combustion will take place in the outlet passageway 36, the operation of the bimetallic strip 97 automatically serves to cut down the supply of gasoline to the correct amount.

The operation of the various parts of the heater has been pointed out above in connection with the description of those parts. When the heater is installed in an automobile or airplane, the outlet conduit 67 is connected to the engine manifold, or in other installations it can be connected to any source of low pressure. The gasoline supply line 59 may be connected to the gasoline supply, such as the usual float chamber, or other reservoir, or to a fuel pump.

The operation of the heater as a whole is controlled by the manipulation of the knob 71. When it is in its "off" position, no fuel is supplied to the heater, and the motor and ignition circuits are open. When the knob is rotated to its "low" position, the valve 61 is partially opened and the circuits to the motor 12 and the spark plug 65 are closed, thereby starting the heater in operation. At this time, a partial combustion of the mixture will occur in the ignition chamber 25 which heats the refractory discs 28 and 29. After the discs have been heated to an incandescent state, the spark plug circuit is automatically opened, due to the provision of the bimetallic contact strip 87, and the mixture thereafter is ignited as it passes through the refractory discs 28 and 29.

If it is desired to obtain a greater amount of heat from the heater, the knob 71 is rotated toward or into its "high" position. If as a result of this adjustment, or due to other conditions, such as a variation in the richness of the mixture, combustion is not confined to the combustion chamber 35, the outlet conduit will become heated up to an extent wherein the bimetallic strip 97 will become operative to cut down the amount of fuel supplied to the heater. If the motor 12 should fail, the bimetallic strip 95 would operate in a similar manner, due to the increased radiation from the fins 15, or due to the lack of cool air which is blown by this bimetallic strip. Thus, the strip 95 protects against motor failure. Also, it is a standby safety control for abnormal temperatures which may develop through other causes. Rotation of the knob 71 back to its "off" position will shut off the heater entirely.

Although only a preferred modification of this invention has been shown and described herein, it will be understood that various modifications and changes may be made therein without departing from the spirit of this invention. It is understood that the foregoing is intended to be illustrative only, and that this invention is to be limited only by the following claims.

I claim:

1. In a combustion heater of the class described having heat generating means wherein the amount of heat generated thereby is responsive to the amount of fuel supplied thereto, the combination of a fuel control valve for regulating the amount of fuel supplied to said combustion heater, an outlet conduit for said heat generating means, a sliding control member for determining the position of said valve, a spring bearing against said control member to bias said valve to its open position, said control member being provided with a plurality of transverse slots, slidably mounted wedge-shaped members extending into said slots and separately adapted to be displaced to bear against said control member to hold the same in a predetermined axial position against the bias of said valve, said slots being wider than said wedge shaped members to permit independent movement of said control member, a manually adjustable member engaging one of said wedge shaped members for determining the position thereof, and thermally responsive means mounted in heat receiving relationship with respect to said outlet conduit and engaging another of said wedge shaped members to displace said sliding control member and valve toward closed position from its position as determined by said first mentioned wedge shaped member when the heat transmitted from said outlet conduit to said thermally responsive means is in excess of a predetermined amount.

2. In a combustion heater of the class described, having heat generating means wherein the amount of heat generated thereby is responsive to the amount of fuel supplied thereto, the combination of a fuel control valve for regulating the amount of fuel supplied to said combustion heater, means biasing said valve to open position, a slotted plunger for said valve, a slidably mounted wedge-shaped member extending into said slot and bearing against one wall thereof to hold said plunger in a predetermined axial position against the bias of said valve, manual control means for determining the position of said wedge-shaped member, and thermally responsive means mounted in heat receiving relationship with respect to said heat generating means and bearing against said plunger to displace said valve towards its closed position from its position as determined by the position of said wedge-shaped member when the heat generated by said heat generating means and transmitted to said thermally responsive means is in excess of a predetermined amount.

3. In a combustion heater having means forming a combined combustion and heat exchange chamber, heat radiating means provided for the walls of said chamber, an outlet conduit for said chamber, and fuel supply means, the combination of means providing communication between said fuel supply means and said chamber and including a fuel control valve for regulating the amount of fuel supplied to said combustion chamber, said valve being biased to open position, and control means for said valve to reduce the amount of fuel supplied thereby in order to prevent overheating of said combustion heater, said control means comprising thermally actuated means associated with said outlet conduit for positively displacing said valve toward its closed position as the temperature of said outlet conduit exceeds a predetermined degree, a second thermally actuated means responsive to the amount of heat radiated by said radiating means for positively displacing said valve toward its closed position, and manually controlled means for limiting the position of said valve toward its open position.

4. In a combustion heater having means forming a combined combustion and heat exchange chamber, heat radiating means provided for the walls of said chamber, an outlet conduit for said chamber, and fuel supply means, the combination of means providing communication between said fuel supply means and said chamber and including a fuel control valve for regulating the amount of fuel supplied to said combustion chamber, said valve being biased to open position, thermally actuated control means associated with said outlet conduit for positively displacing said valve toward its closed position as the temperature of said outlet conduit exceeds a predetermined degree, a second thermally actuated control means responsive to the amount of heat radiated by said heat radiating means for positively displacing said valve toward its closed position, manual control means for positively displacing said valve toward its closed position, and ignition means controlled by said manual control means.

5. In a combustion heater having means forming a combined combustion and heat exchange chamber, heat radiating means provided for the walls of said chamber, an outlet conduit for said chamber, and fuel supply means, the combination of means providing communication between said fuel supply means and said chamber and including a fuel control valve for regulating the amount of fuel supplied to said combustion chamber, said valve being biased to open position, a refractory member for igniting said fuel as it passes into said combustion chamber, and control means for said valve to reduce the amount of fuel supplied thereby in order to prevent overheating of said combustion heater, said control means comprising thermally actuated means associated with said outlet conduit for positively displacing said valve toward its closed position as the temperature of said outlet conduit exceeds a predetermined degree, a second thermally actuated means responsive to the amount of heat radiated by said heat radiating means for positively displacing said valve toward its closed position, manual control means for opening and closing said valve, auxiliary ignition means for initially igniting said fuel and controlled by said manual control means so as to become operative when said manual control means is actuated to open said valve, and thermally responsive means for rendering said auxiliary ignition means inoperative when said refractory member has been heated to an incandescent state.

THEODORE S. BRISKIN.

REFERENCES CITED

The following references are of record in the file of this patent:

UNITED STATES PATENTS

| Number    | Name          | Date           |
|-----------|---------------|----------------|
| 1,673,900 | Chadwick et al. | June 19, 1928 |
| 1,779,572 | Valjean       | Oct. 28, 1930  |
| 1,846,978 | Parker et al. | Feb. 23, 1932  |
| 2,157,643 | Westwick      | May 9, 1939    |
| 2,192,688 | McCollum      | Mar. 5, 1940   |
| 2,200,232 | McCollum      | May 7, 1940    |
| 2,247,405 | Raney         | July 1, 1941   |
| 2,254,801 | George        | Sept. 2, 1941  |
| 2,270,824 | Meyerhoefer   | Jan. 20, 1942  |
| 2,270,955 | McCollum      | Jan. 27, 1942  |
| 2,332,094 | McCollum      | Oct. 19, 1943  |